United States Patent [19]

Usui et al.

[11] Patent Number: 5,116,084

[45] Date of Patent: May 26, 1992

[54] STEEL EYEJOINT

[76] Inventors: Masayoshi Usui, 843-14, Hon-Matsushita, Shizuoka Prefecture, Numazu; Yasumitsu Kikuchi, 177-9, Kona, Izunagaoka-cho, Shizuoka Prefecture, Shizuoka, both of Japan

[21] Appl. No.: 583,452

[22] Filed: Sep. 17, 1990

[30] Foreign Application Priority Data

Sep. 18, 1989 [JP] Japan .................. 1-108892[U]
Sep. 18, 1989 [JP] Japan .................. 1-108893[U]

[51] Int. Cl.$^5$ .................................................. F16L 41/00
[52] U.S. Cl. ........................................... 285/190; 285/286
[58] Field of Search ............ 29/890.141, 890.148; 285/156, 190, 424, 286, 419; 138/171

[56] References Cited

U.S. PATENT DOCUMENTS

| 755,436 | 3/1904 | Bentel | 138/171 X |
| 1,648,057 | 11/1927 | Parker | 285/156 X |
| 3,709,532 | 1/1973 | Caligiuri | 285/156 X |
| 4,636,105 | 1/1987 | Johansson | 285/424 X |
| 4,927,190 | 5/1990 | Nishikawa | 285/190 X |

FOREIGN PATENT DOCUMENTS

| 80627 | 6/1951 | Czechoslovakia | 29/890.148 |
| 798402 | 5/1936 | France | 29/890.148 |
| 442288 | 1/1936 | United Kingdom | 29/890.148 |

Primary Examiner—Dave W. Arola

[57] ABSTRACT

A steel eyejoint for receiving the end of a pipe and attaching itself to a frame is made of a pair of half members. Each half member consists of a flat head section formed with an attaching hole and a tail section extending from the head section. The head section has an annular flow path defined thereinside which is in communication with the attaching hole and with the inside of the tail section. An opening edge of one half member is partly overlapped with that of the other. The two half members are brazed together along the overlap line between the opening edges.

9 Claims, 4 Drawing Sheets

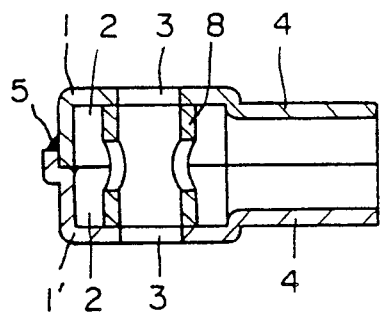
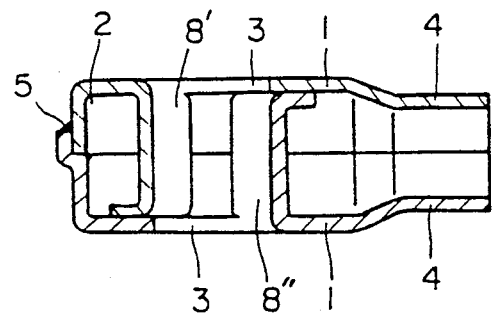
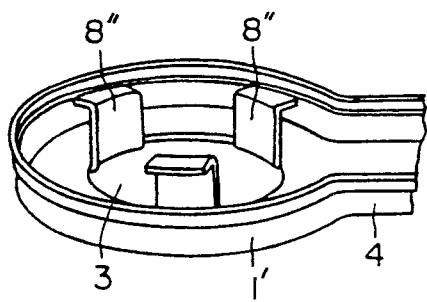
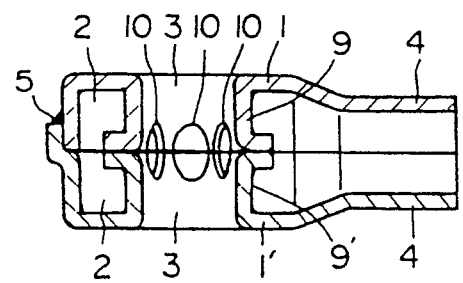
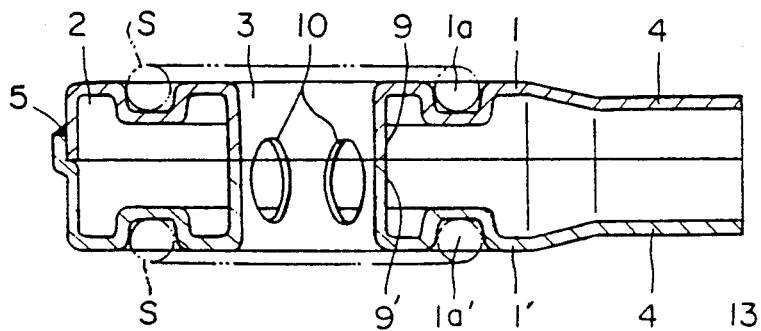
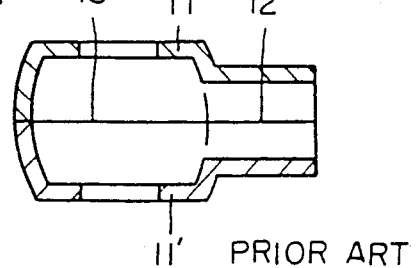

STEEL EYEJOINT

BACKGROUND OF THE INVENTION

1. Field of the Invention

This invention relates to an eyejoint made from a steel plate by press working, which is used in various machines such as cars, specifically, which is attached to a frame after being connected to the end of a pipe of comparatively small diameter (no greater than about 20 mm) that is used as a supply path of oil, air, etc.

2. Description of the Prior Art

A conventional eyejoint is made from a steel plate by press working into such a shape as shown in FIG. 22 (see Japanese Utility Model Publication No. 35-3402). Specifically, two halves 11 and 11' are brought into abutment contact with each other at their opening edges 12 and 12', and the abutting edges are welded together along a weld line 13.

In the foregoing prior art, since welding is performed while keeping the opening edges 12 and 12' in abutment contact with each other, tacking is required beforehand (this step is troublesome), a solder runs over during welding (this results in imperfect welding), and an insufficient strength of welding causes leakage at the welded portion 13 under vibration conditions.

SUMMARY OF THE INVENTION

It is an object of the present invention to provide a steel eyejoint which can be completed by brazing without the need of tacking, can have an increased area of joining to increase the strength of brazing, eliminating a fear of leakage even under vibration conditions, and can give a high rigidity to a pipe receiving portion.

To accomplish the foregoing object, the present invention provides a steel eyejoint which comprises a pair of half members, wherein each half member consists of a flat head section formed with an attaching hole and a tail section extending from the head section, the tail sections assembled of the half members define a hollow space thereinside for receiving the end of a pipe, each head section has an annular flow path defined thereinside which is in communication with the attaching hole and with the inside of the tail section, an opening edge of one half member is overlapped with that of the other at least partly, and the thus overlapped opening edges are brazed together. The sectional shape of the tail section is substantially semicircular or semielliptical.

In modification, one tail section is cylindrical, and the other is shaped as to surround the cylindrical tail section at least partly when fitted thereto.

To increase the rigidity of the eyejoint, each half member may have a burr portion extending inward from the circumference of the attaching hole. A cylindrical support may be accommodated in the eyejoint in alignment with the attaching holes. Each half member may have a few tongue portions or a cylindrical portion extending from the circumference of the attaching hole as to abut on the inner surface of the other member.

Because the opening edges are overlapped with each other at least partly, tacking is virtually unnecessary, a brazing solder never runs over, brazing is reliably completed, the rigidity of the pipe receiving portion is increased, and no leakage occurs even under vibration conditions.

BRIEF DESCRIPTION OF THE DRAWINGS

FIGS. 17 and 18 are sectional views of further embodiments;

FIG. 19 is a perspective view of one half member of the embodiment shown in FIG. 18;

FIGS. 20 and 21 are sectional views of further embodiments; and

FIG. 22 is a sectional view of a conventional eyejoint.

DETAILED DESCRIPTION OF THE PREFERRED EMBODIMENTS

Figure 1:
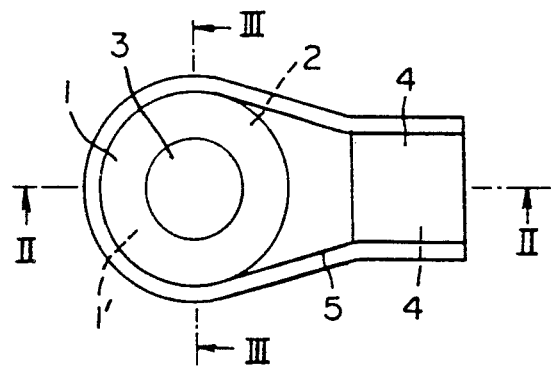
FIG. 1 is a plan view showing an embodiment of a steel eyejoint according to the present invention.
Figure 2:
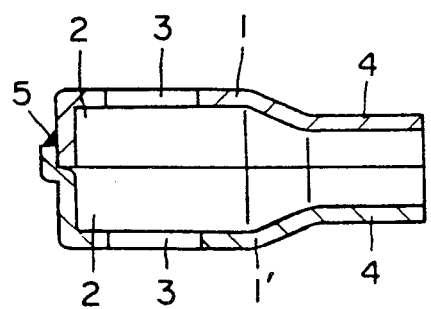
FIG. 2 is a sectional view taken along line II—II in FIG. 1.
Figure 3:
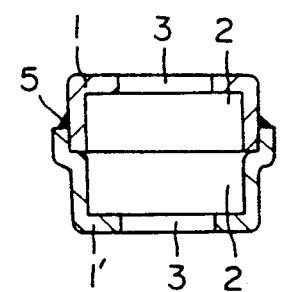
FIG. 3 is a sectional view taken along line III—III in FIG. 1.

In FIGS. 1 through 21, identical parts are designated by the same reference numerals.

A pair of half members 1 and 1' is made from a steel plate by press working. Each half member has a flat head section. This head section is formed with an attaching hole 3 through which a clamp bolt (not shown) is passed for attachment to a frame. An annular flow path 2 is defined inside the head section. A tail section 4 is provided integrally with the head section, whose sectional shape is substantially semicircular (see FIGS. 1, 15 and 17) or semielliptical (see FIGS. 4(a) and (b) ). The two half members 1 and 1' are assembled together by brazing (5) along their opening edges under the condition that the attaching holes 3 are aligned with each other and/or the tail sections 4 are coupled together to define a single through hole 6 (see FIGS. 4(a) and (b) ). In the embodiments shown in FIGS. 2, 3, 16 and 17, the opening edges of the half members 1 and 1' are slightly overlapped with each other, whereas in the embodiments shown in FIGS. 5, 6 and 7, they are sufficiently overlapped with each other as if two wall portions are held in contact with each other.

Figure 16:
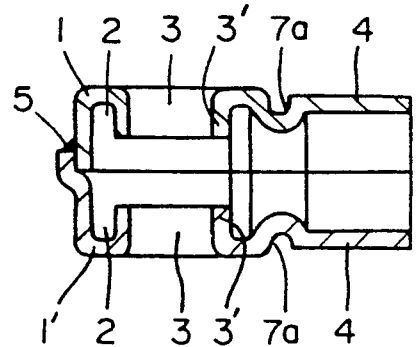
FIG. 16 is a sectional view taken along line XVI—XVI in FIG. 15.

If desired, each attaching hole 3 may be modified such that a burr portion 3' extends inward from the circumference of the hole (see FIG. 16). In this case, the eyejoint becomes well resistant to tightening, as is the case the opening edges are sufficiently overlapped with each other.

Figure 4A:
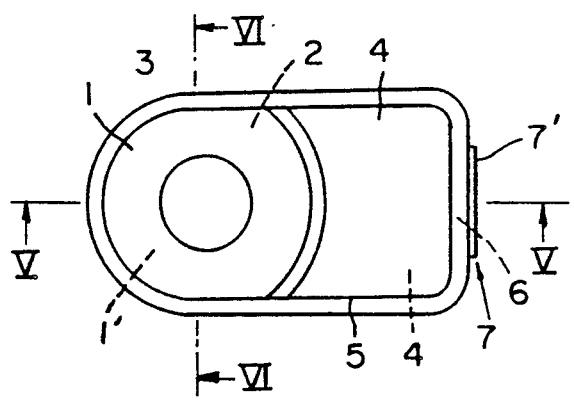
FIGS. 4(a) and (b) are plan views of other embodiments.
Figure 4B:
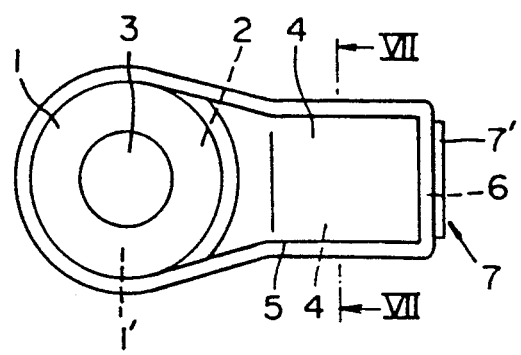
Figure 5:
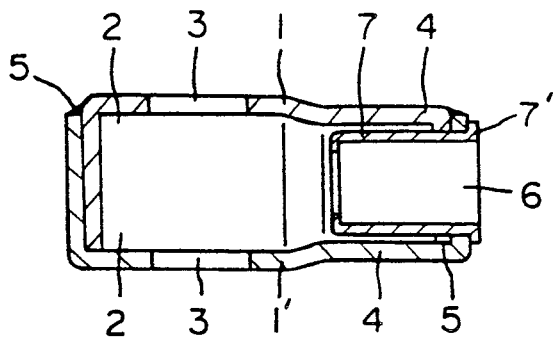
FIG. 5 is a sectional view taken along line V—V in FIG. 4(a)
Figure 6:
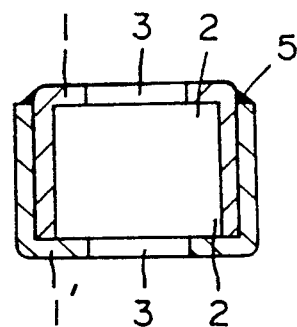
FIG. 6 is a sectional view taken along line VI—VI in FIG. 4(a)
Figure 7:
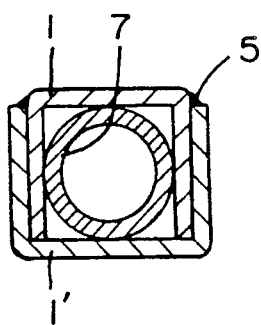
FIG. 7 is a sectional view taken along line VII—VII in FIG. 4(b)
Figure 8:
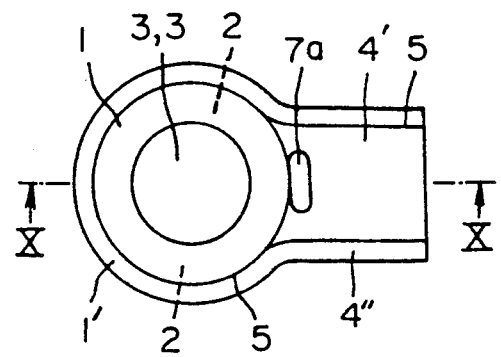
FIG. 8 is a plan view of a further embodiment.
Figure 9:
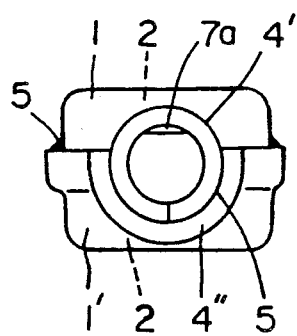
FIG. 9 is a right side view of the embodiment shown in FIG. 8.
Figure 10:
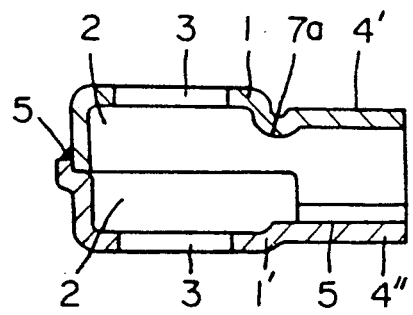
FIG. 10 is a sectional view taken along line X—X in FIG. 8.

In FIGS. 4(a), 4(b) and 5, a short cylinder 7 with a collar portion 7' is fitted in the through hole 6 and brazed thereto as shown. This cylinder 7 increases the rigidity of a pipe receiving portion. The inner end of the cylinder 7 is slightly bent or narrowed so that the end of a pipe cannot enter deeply. The short cylinder 7 shown in FIG. 4 may be included in the embodiment shown in FIGS. 1 through 3.

The embodiments shown in FIGS. 8 through 14 include arrangements of increasing the rigidity of the pipe receiving portion. Specifically, the one half member 1 has a cylindrical tail section 4' which is formed by curving a steel plate into the form of a cylinder, whereas the other half member 1' has a semicylindrical tail section 4" which will fit to the cylindrical tail section 4'. A portion 7a (see FIG. 10) is a part of the one half member 1 projecting inward which acts as stopper for entry of the pipe end.

Figure 11:
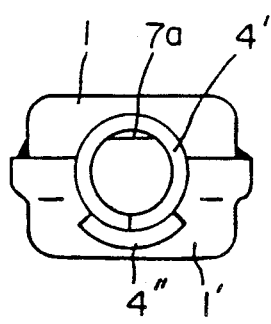
FIGS. 11 through 13 are right side views of further embodiments.
Figure 12:
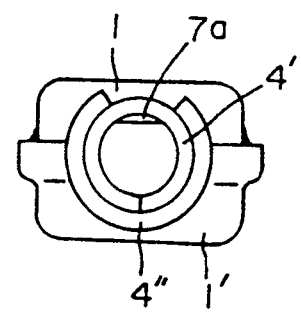
Figure 13:
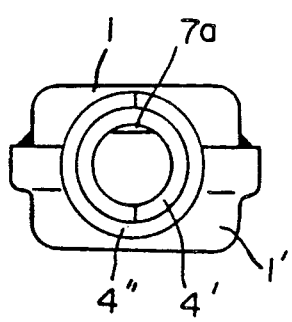
Figure 14:
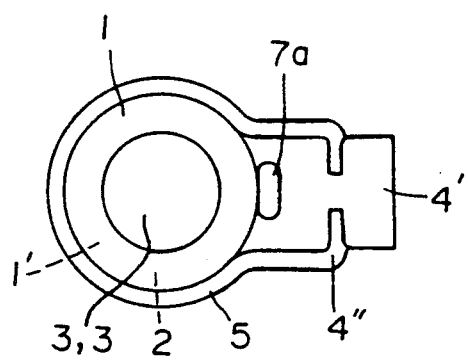
FIGS. 14 and 15 are plan views of further embodiments.
Figure 15:
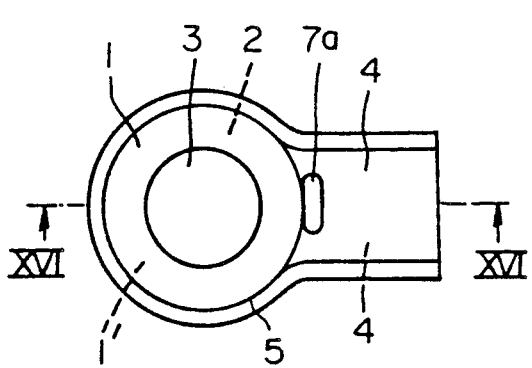

The tail section 4" may have a substantially C-shape in cross section such that the abutting line of the tail section 4' is supported as shown in FIG. 11. Further, the tail section 4" may have a substantially circular shape in cross section as shown in FIGS. 12 and 13. In this case, tacking is not required if calking is performed after the opening edges of the two head sections are fitted together. Further, the tail section 4" may be modified such that only a portion of the periphery of the tail section 4' is surrounded as shown in FIG. 14.

In FIG. 17, a cylindrical support 8 with through holes is provided inside the half members 1 and 1' in alignment with the attaching holes 3. This cylindrical support 8 provides a sufficient resistance with respect to tightening as is the case of the burr portion 3' or of the double-wall arrangement.

FIGS. 18 through 21 show other arrangements of increasing resistance to tightening.

In FIGS. 18 and 19, the one half member 1 has a few tongue portions 8' extending at given intervals inward from the circumference of the attaching hole 3 which act as to support the other half member, the other half member 1' has a few tongue portions 8" similarly, and these tongue portions 8' and 8" are disposed alternatively when the two half members are assembled.

In FIG. 20, the one half member 1 has an annular wall portion 9 extending inward from the circumference of the attaching hole 3, the other half member 1' has a similar wall portion 9', and the respective ends of the two annular wall portions 9 and 9' are brazed together. In this case, to ensure communication with the annular flow path 2, a few holes 10 are formed in the annular wall portions 9 and 9'.

As shown in FIG. 21, to enhance the power of sealing between the outer surface of the half members 1 and 1' and a mating component or the head of the clamp bolt, a sealing element S such as an O-ring is preferably provided in an annular groove 1a, 1a' on each side.

As described above, the steel eyejoint according to the present invention is made of the pair of half members 1 and 1' which are brazed (5) along their opening edges fitted together; thus, tacking is virtually unnecessary. The opening edge of either half member (1') is made as spreading slightly outward or having a stepped portion such that the opening edge of one half member is received in the opening edge of the other; thus, brazing can be performed in a furnace, a brazing solder never runs over, and the strength of brazing can be enhanced. The rigidity of the pipe receiving portion is increased; thus, no leakage occurs even when the eyejoint is used under vibration conditions.

What is claimed is:

1. A steel eyejoint comprising a pair of opposed rigid half members, wherein each said half member includes a head section formed with a flat wall having an attaching hole extending therethrough and a peripheral wall extending from the flat wall, each said half member further including a tail section extending from the flat wall and the peripheral wall of the head section, said tail section being generally semi-arcuate in cross-section, said opposed rigid half members being assembled such that the flat walls of the head section are in opposed spaced relationship with the attaching holes thereof being generally registered for receiving a clamp bolt therethrough, the tail sections of the respective half members being partly overlapped and defining a hollow space thereinside for receiving the end of a pipe, the peripheral walls of the respective head sections being at least partly overlapped with an annular flow path defined thereinside which is in communication with the attaching hole and with the hollow space inside of the tail section, and the thus overlapped portions of the half members being brazed together, whereby the overlapping of portions of the opposed half members efficiently retain the half members together prior to brazing and enable an reliable brazed connection therebetween.

2. A steel eyejoint according to claim 1, wherein the sectional shape of each tail section is substantially semicircular.

3. A steel eyejoint according to claim 1 further including a short cylinder accommodated in the hollow space defined between the opposed tail sections.

4. A steel eyejoint according to claim 1, wherein one of the tail sections is cylindrical and the other is shaped as to surround at least a portion of the periphery of the cylindrical tail section.

5. A steel eyejoint according to claim 4, wherein the sectional shape of the other tail section is substantially circular.

6. A steel eyejoint according to claim 4 wherein the sectional shape of the other tail section is substantially semicircular.

7. A steel eyejoint according to claim 1, wherein each flat wall has a burring portion extending inwardly from portions thereof defining the circumference of the attaching hole.

8. A steel eyejoint according to claim 1, further including a cylindrical support accommodated in the inside of the half members in alignment with the attaching holes, such that the annular flow path is defined generally intermediate the peripheral walls and the cylindrical support.

9. A steel eyejoint according to claim 1, wherein each half member has a tongue portion extending inward from the flat wall adjacent the circumference of the attaching hole so as to abut on the flat wall of the other half member.

* * * * *